United States Patent
Shan et al.

(10) Patent No.: US 11,009,724 B2
(45) Date of Patent: May 18, 2021

(54) POLARIZED FILMS WITH SPECIFIC LIGHT FILTERS

(71) Applicant: Essilor International, Charenton-le-Pont (FR)

(72) Inventors: Haifeng Shan, Dallas, TX (US); Aref Jallouli, Dallas, TX (US); Hao-Wen Chiu, Dallas, TX (US); Srini Balasubramanian, Dallas, TX (US); Haipeng Zheng, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 118 days.

(21) Appl. No.: 16/317,762

(22) PCT Filed: Jul. 15, 2016

(86) PCT No.: PCT/IB2016/001144
§ 371 (c)(1),
(2) Date: Jan. 14, 2019

(87) PCT Pub. No.: WO2018/011613
PCT Pub. Date: Jan. 8, 2018

(65) Prior Publication Data
US 2019/0250431 A1    Aug. 15, 2019

(51) Int. Cl.
*G02C 7/10* (2006.01)
*G02B 5/22* (2006.01)
*G02B 5/30* (2006.01)
*G02B 1/04* (2006.01)
*G02C 7/12* (2006.01)

(52) U.S. Cl.
CPC .............. *G02C 7/10* (2013.01); *G02B 1/041* (2013.01); *G02B 5/223* (2013.01); *G02B 5/305* (2013.01); *G02B 5/3033* (2013.01); *G02B 5/3075* (2013.01); *G02C 7/12* (2013.01); *G02C 2202/16* (2013.01)

(58) Field of Classification Search
CPC ... G02B 1/04; G02B 5/30; G02B 1/11; G02B 5/20; G02C 7/12; G02C 7/10
USPC ........ 351/49, 44, 41, 159.6, 159.29, 159.32, 351/159.65, 159.56, 159.27
See application file for complete search history.

(56) References Cited

U.S. PATENT DOCUMENTS 8,403,478 B2 *  3/2013  Ishak ................ G02C 7/104
                                                   351/159.6
2015/0355395 A1  12/2015  Kimura et al.

FOREIGN PATENT DOCUMENTS

CN    105283784 A    1/1916
CN    2152221 Y      1/1994
(Continued)

OTHER PUBLICATIONS

International Search Report and Written Opinion issued in International Patent Application No. PCT/IB2016/001144, dated Mar. 16, 2017.

(Continued)

*Primary Examiner* — Hung X Dang
(74) *Attorney, Agent, or Firm* — Norton Rose Fulbright US LLP (57) ABSTRACT

Disclosed are polarized films containing specific light filters that block transmission of harmful electromagnetic radiation. Also disclosed are methods of producing said films as well as ophthalmic lenses having increased eye health.

16 Claims, 2 Drawing Sheets

(56) References Cited

FOREIGN PATENT DOCUMENTS

EP           0605191        7/1994
WO    WO 03/001287         1/2003

OTHER PUBLICATIONS

First Office Action issued by the Chinese Patent Office in corresponding International Application PCT/IB2016/001144 dated Sep. 11, 2020.

* cited by examiner

POLARIZED FILMS WITH SPECIFIC LIGHT FILTERS

CROSS-REFERENCE TO RELATED APPLICATIONS

This application is a national phase application under 35 U.S.C. § 371 of International Application No. PCT/IB2016/001144 filed 15 Jul. 2016, the entire contents of which is specifically incorporated herein by reference without disclaimer.

BACKGROUND OF THE INVENTION

A. Field of the Invention

The invention generally concerns polarized optical products and general eye health. In particular, the invention concerns polarized polyvinyl alcohol (PVOH) films containing specific light filters that block the eye from harmful electromagnetic radiation.

B. Description of Related Art

Polarizing films block glare caused by light reflection of specular surfaces. Polarizing films have been widely employed, for example, in liquid crystal displays of, e.g., pocket electric calculators, watches, word processors, liquid crystal printers, liquid crystal color TV's, various instruments and automotive instrument panels. Further, they are inserted into laminated glass to form an anti-glare film for, e.g., sunglasses or ski goggles. Polyvinyl alcohol (PVOH) films are commonly used in polarized lens products due to their excellent polar function. However, polarized PVOH films are unable to filter wavelengths of the incoming light that can have detrimental effects on general eye health. Iodine and/or dichroic dyes are used in PVOH films to filter broad ranges of electromagnetic radiation but provide no selective control over wavelength that can damage the eye including blue light at 415-455 nm and/or near infrared (NIR) at 700-1400 nm.

SUMMARY OF THE INVENTION

A discovery has been made that provides a solution to the problems associated with polyvinyl alcohol (PVOH) films containing dichroic dyes used in polarized lens products. The discovery is premised on the addition of specific light filters in polarized optical products to improve eye health. In particular, electromagnetic radiation at certain wavelengths, such as blue light (415-455 nm) or near infrared (NIR) light (700-1400 nm), are harmful to human eyes. Wearing polarized sunglasses containing filtering agents that block these wavelengths could alleviate such damage.

In one embodiment of the present invention, there is disclosed a polarized film that includes at least one dichroic dye capable of providing polarized function, and at least one light filter capable of decreasing or increasing light transmission at specific ranges of wavelengths to provide a dedicated light filtering function. In some aspects, the polarized film further includes polyvinyl alcohol (PVOH). In one aspect, the at least one dichroic dye can be iodine. In another aspect, the at least one dichroic dye or at least one light filter is capable of decreasing the transmission of ultraviolet (UV) light at and below 400 nm. In another aspect, the at least one dichroic dye or at least one light filter is capable of decreasing the transmission of blue-violet light from 415 to 455 nm. In yet another aspect, the at least one dichroic dye or at least one light filter is capable of decreasing the transmission of near-infrared (NIR) light from 700 to 1400 nm. In particular aspects, the at least one light filter can include water soluble cut dyes or absorbers of UV, blue-violet, NIR, or combinations thereof. The blue-violet cut dye or absorber can be coumarin, porphyrin, perylene, melanin, acriflavine, proflavine, chlorophyll, Lucifer yellow, auramine, or derivatives thereof, and/or the NIR cut dye or absorber can be amminium salt, cyanines, metal dithiolenes, phtalocyanines, anthraquinone, tetraaryldiamines, or a derivative thereof. In some aspects, the PVOH has a degree of polymerization that is equal to or greater than 1500.

In another embodiment of the present invention there is disclosed a multilayer polarized laminate including the above mentioned polarized film wherein the polarized film further includes at least one outer layer adhering to the polarized film, wherein the outer layer can be composed of polycarbonate (PC), cellulose triacetate (TAC), polyolefinics, polyacrylates, polyesters, polyamides, polysiloxanes, polyimides, polyurethanes, polythiourethanes, polyallylics, polysulfides, polyvinyls, polyarylenes, polyoxides, and polysulfones, or combinations thereof. In one aspect, the polarized film has a percent transmittance (% T) in the range of 415-455 nm that decreases at least about 10% compared to a polarized film without a blue-violet light filter. In another aspect, the polarized film has a percent transmittance (% T) in the range of 700-1400 nm that decreases at least about 5% compared to a polarized film without an NIR filter.

In another embodiment of the present invention there is disclosed a polarized ophthalmic lens with specific filter function including the above mentioned polarized film and at least one substrate, wherein the substrate is a thermoplastic material including at least one polycarbonate (PC), polyolefinics, (meth)acrylic or thio(meth)acrylic polymers and copolymers, polyesters, polyamides, polysiloxanes, polyimides, polyurethanes, polythiourethanes, polyallylics, polysulfides, polyvinyls, polyarylenes, polyoxides, and polysulfones, and combinations thereof, or a thermoset material including at least one resin resulting from the polymerization or (co)polymerization of alkylene glycol bis allyl carbonates.

One advantage of the current invention is that it allows water soluble specific light filters to be used with existing processes and methods to prepare polarized PVOH films directly or with minor modification to make polarized PVOH films with added eye health benefit. Additionally, these specific light filters can be used with or without dichroic dyes in solution where optical properties, such as transmittance, lens color, and polarization efficiency may not be affected. In still another embodiment of the present invention, there is disclosed a method to prepare the disclosed polarized film, the method including (a) preparing one or several solutions containing at least one light filter and at least one dichroic dye in water, where the light filter and dichroic dye are in the same solution or in separate solutions; (b) submersing the PVOH film in the solution(s) from step (a) for an amount of time and pulling the film within the solution(s) to remove wrinkles; and (c) stretching the film within the solution(s) to get polarizing function, wherein the at least one dichroic dye or at least one light filter is capable of decreasing the transmission of ultraviolet (UV) light at and below 400 nm, decreasing the transmission of blue-violet light from 415 to 455 nm, or decreasing the transmission of near-infrared (NIR) light from 700 to 1400 nm. In one aspect, the method further comprising (d) laminating the film from step (c) with polycarbonate (PC) on both sides; (e) thermoforming the laminate into curved wafers; and (f) injection molding polycarbonate (PC) on the concave side.

The following includes definitions of various terms and phrases used throughout this specification.

The term "dichroic dye" means a dye showing absorbance varying depending on a direction. In optics, a dichroic material is either one which causes visible light to be split up into distinct beams of different wavelengths or one in which light rays having different polarizations are absorbed by different amounts. "Dichromatism" (or polychromatism) is a phenomenon where a material or solution's hue is dependent on both the concentration of the absorbing substance and the depth or thickness of the medium traversed. In most substances which are not dichromatic, only the brightness and saturation of the color depend on their concentration and layer thickness. Examples of dichromatic substances are pumpkin seed oil, bromophenol blue and resazurin. When the layer of pumpkin seed oil is less than 0.7 mm thick, the oil appears bright green, and in layer thicker than this, it appears bright red. The phenomenon is related to both the physical chemistry properties of the substance and the physiological response of the human visual system to color.

The term "about" or "approximately" are defined as being close to as understood by one of ordinary skill in the art, and in one non-limiting embodiment the terms are defined to be within 10%, preferably within 5%, more preferably within 1%, and most preferably within 0.5%.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The polarized films of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the polarized films of the present invention are the inclusion of specific light filters for blocking harmful electromagnetic radiation.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

DETAILED DESCRIPTION OF THE INVENTION

A discovery has been made that provides a solution to the problems associated with polyvinyl alcohol (PVOH) films containing dichroic dyes used in polarized lens products. The discovery is premised on the addition of specific light filters in polarized optical products to improve eye health. In particular, electromagnetic radiation at certain wavelengths, such as blue light (415-455 nm) or near infrared (NIR) light (700-1400 nm), are harmful to human eyes. Typical dichroic dyes are not able to filter these wavelengths. Wearing polarized sunglasses containing filtering agents that block these wavelengths could alleviate such damage. One advantage of the current invention allows water soluble specific light filters to be used with existing processes and methods to prepare polarized PVOH films directly or with minor modification to make polarized PVOH films with added eye health benefit. Additionally, these specific light filters can be used with or without dichroic dyes in solution where optical properties, such as transmittance, lens color, and polarization efficiency may not be affected.

These and other non-limiting aspects of the present invention are discussed in further detail in the following sections.

A. Polarized Film

The polarizing film of the present invention employs a uniaxially stretched PVOH film as a base. The PVOH used in the present invention should have a degree of polymerization that is greater than 1000, and still more preferably that is greater than 1500. From the viewpoint of the optical properties and durability of the polarizing film, it is preferred that the degree of polymerization of the PVOH is as high as possible. However, the degree of polymerization of the PVOH is typically less than about 10,000 in practice, by taking the production cost into consideration. A polarizing film containing a PVOH film wherein the degree of polymerization of the PVOH is less than about 1,500 may have unsatisfactory mechanical and optical properties, including increased solubility in water. The PVOH can be atactic or syndiotactic. Preferably the PVOH film is syndiotactic for better crystallization properties. Without limitation, PVOH film is readily available from several sources, for example Sekisui Specialty Chemicals, Dallas, Tex. or Nippon Gohsei USA Co. Ltd., La Porte Tex. Preferably, the PVOH film is DP1700 or DP2400 commercially available from Kuraray America Inc., Houston, Tex.

B. Dichroic Dyes

In one embodiment, the polarized films contain at least one dichroic dye. Dichroic dyes of the present invention refer to both iodine and molecules containing at least one double bond selected from non-aromatic C=C, C=N and N=N. Dichroic dyes generally also include aromatic ring structures, in addition to benzene, naphthalene, and phenanthrene; heterocyclic rings such as thiazole, pyridine, pyrimidine, pyridazine, pyrazine, quinoline, etc., and the quaternary salts of them, and further the condensed rings thereof and benzene, naphthalene, etc., are particularly preferred. In most instances, water soluble dichroic dyes also contain a hydrophilic substrate such as a sulfonic group, a carboxylic group, an amino group, a hydroxyl group, etc., introduced in these aromatic rings. Also, in some embodiments the least one dichroic dye of the present invention can be iodine.

From a structural point of view, dichroic dyes mainly fall into two classes including azo and anthraquinone based dyes. Other dichroic dyes envisioned in the current embodiments include methine, azomethine (Schiff base), merocyanine, napthoquinone, benzoquinone, tetrazine, hydroxyquinophthalone, perylene, and azulene based dyes. Examples of the dichroic dye include azo-base dyes, cyanine-base dyes, anthraquinone-base dyes including condensed-base such as indanthrone, etc., stilbene-base dyes, pyrazolone-base dyes, perylene-base dyes, naphthalimide-base dyes, triphenylmethane-base dyes, quinoline-base dyes, oxazine-base dyes, thiazine-base dyes, quinophthalone-base dyes, indigo-base dyes, thioindigo-base dyes, etc. For these dyes, water-soluble dyes are preferred but other dyes can be, as a matter of course, used in the invention. As the dichroic dye, yellow, orange, blue, purple or red dyes may be used. Typical examples thereof include direct dyes including C.I. Direct dyes such as Black 17, Black 19 and Black 154, Brown 44, Brown 106, Brown 195, Brown 210 and Brown 223, Red 2, Red 23, Red 28, Red 31, Red 37, Red 39, Red 79, Red 81, Red 240, Red 242 and Red 247, Blue 1, Blue 15, Blue 22, Blue 78, Blue 90, Blue 98, Blue 151, Blue 168, Blue 202, Blue 236, Blue 249 and Blue 270, Violet 9, Violet 12, Violet 51, and Violet 98, Green 1 and Green 85, Yellow 8, Yellow 12, Yellow 44, Yellow 86 and Yellow 87, Orange 26, Orange 39, Orange 106 and Orange 107 and dispersion dyes including C.I. Dispersion dyes such as Blue 214, Red 60 and Yellow 56. Other examples of dichroic dyes include Everacid Black ND, Everacid Black SRL H/C, Everacid Blue AFN, Everacid Blue Black 10B H/C, Everacid Blue HRL, Everacid Blue RL, Everacid Blue RRL, Everacid Leveling Blue A2G, Everacid Milling Cyanine 5R, Everacid Milling Red Brown V, Everacid Milling Yellow MR, Everacid Orange G, Everacid Red B, Everacid Rubine 5BL, Everacid Yellow 5GW, Everacid Yellow NFG, Evercion Black P-GR, Evercion Black P-N, Evercion Blue H-EGN 125%, Evercion Blue H-ERD, Evercion Blue P-3R, Evercion Blue P-GR, Evercion Brown P-4RD, Evercion Golden Yellow P-R, Evercion Green H-E4BD, Evercion Navy Blue H-ER, Evercion Orange H-ER, Evercion Orange P-2R, Evercion Red H-E3B, Evercion Red H-E7B, Evercion Red P-2B, Evercion Red P-4BN, Evercion Scarlet H-E3G, Evercion Scarlet P-RN, Evercion Turquoise H-A,m Evercion Turquoise P-GF,m Evercion Yellow H-E4G, Evercion Yellow H-E4R, Evercion Yellow H-E6G, Evercion Yellow P-4G, Evercion Yellow P-4G, Evercion Yellow P-N3R, Evercron Black XF, Evercron Blue XF, Evercron Navy XF, Evercron Rubine XF, Evercron Yellow Brown XEF, Everdirect Black ANBN, Everdirect Black OBV, Everdirect Fast Black VSF 600, Everdirect Light Rose FR, Everdirect Light Scarlet F2G, Everdirect Supra Blue 4BL, Everdirect Supra Blue BRL 200, Everdirect Supra Blue BRR, Everdirect Supra Blue FFRL, Everdirect Supra Grey CGL, Everdirect Supra Orange 2GL 125 Everdirect Supra Red BWS, Everdirect Supra Rubine BL, Everdirect Supra Rubine BL, Everdirect Supra Turquoise Blue GRL, Everdirect Supra Yellow PG, Everdirect Supra Yellow RL, Everlan Black NBR, Everlan Black NGS, Everlan Brown E5G, Everlan Brown EDG, Everlan Brown EDR, Everlan Brown EDW, Everlan Brown EFR, Everlan Brown EGB, Everlan Brown EGL, Everlan Brown EGR, Everlan Brown ESG, Everzol Black ED, Everzol Black GRN, Everzol Black GSP, Everzol Black N, Everzol Blue ED, Everzol Blue R S/P, Everzol Brilliant Orange 3R, Everzol Green 6B, Everzol Green GW, Everzol Navy Blue FBN, Everzol, Navy Blue GG, Everzol Navy Blue RFN, Everzol Navy Blue RGB, Everzol Navy ED, Everzol Red 3BS H/C, Everzol Red BB, Everzol Red ED, Everzol Supra Brilliant Red F2B, Everzol Turquoise Blue G, Everzol Yellow 3GL, Everzol Yellow 3RS H/C, Everzol Yellow 4GL, Everzol Yellow ED, and Everzol Yellow GR commercially available from Everlight USA Inc., Charlote, N.C. Specific dichroic dyes include Everlight Everdirect Blue, Everlight Everdirect Yellow, and Everlight Everdirect Red. In the present invention, two or more dichroic dyes may be used together. Furthermore, at least one dichroic dye and other light filters may be used together in the present invention in order to provide an increased eye health benefit and/or controlled hue. Dichroic dyes are readily available from multiple sources, for example Oriental Giant Dyes and Chemical Ind. Corp, Taiwan or Taiwan Dyestuffs & Pigments Corp, Taiwan.

C. Specific Light Filters

In another embodiment, the polarized films of the current invention contain at least one light filter capable of decreasing or increasing light transmission at specific ranges of wavelengths to provide a dedicated light filtering function. The at least one specific light filter can include water soluble cut dyes or absorbers of UV, blue-violet, IR, or combinations thereof. In one aspect, specific light filters can include at least one of any of the aforementioned dichroic dyes or at least one light filter that is capable of decreasing the transmission of ultraviolet (UV) light at and below 400 nm. Specifically, the at least one dichroic dye or at least one light filter is capable of decreasing the transmission of blue-violet light from 415 to 455 nm. For the purpose of the current disclosure, dichroic dyes and light filters having these properties are referred to as blue-violet cut dyes or blue-violet absorbers. In a preferred aspect, the blue-violet cut dye or blue-violet absorber is coumarin, porphyrin, perylene, melanin, acriflavine, proflavine, chlorophyll, Lucifer yellow, auramine, or derivative thereof. Some specific examples of a blue-violet cut dye include Basic Yellow 40, Basic Yellow 2 (Auramine O), Coumarin 519, and 3,3'-diethyloxacarbocyanine iodide. In another aspect, specific light filters can include at least one of any of the aforementioned dichroic dyes or at least one light filter that is capable of decreasing the transmission of near-infrared (NIR) light from 700 to 1400 nm. For the purpose of the current disclosure, dichroic dyes and light filters having these properties are referred to as NIR cut dyes or NIR absorbers. In a preferred aspect, the NIR cut dye or NIR absorber is amminium salt, cyanines, metal dithiolenes, phtalocyanines, anthraquinone, tetraaryldiamines, or derivative thereof. A specific example of a NIR cut dye is Epolight 2735 or NIR1054B. 4'4-Thiodiphenyl can be added to improve tintability. A non-limiting commercial source of blue-violet and NIR cut dyes includes Armor Forensics, Jacksonville, Fla. and Sigma-Aldrich, USA.

When wet-stretching of the PVOH film is preformed, the at least one dichroic dye and/or the at least one blue-violet cut dye and/or the at least one NIR cut dye used to block eye damaging electromagnetic radiation may be simultaneously added during the swelling or stretching step. In one instance, when the light filters that can be dissolved in aqueous solutions are applied to the swelling or stretching step, the light filters are each provided in about 0.001 to 30% by weight, preferably 0.01% to 10% by weight, and all weight percentages there between, including 0.05%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, 9.1%, 9.2%, 9.3%, 9.4%, 9.5%, 9.6%, 9.7%, 9.8%, or 9.9% by weight. Specifically, the at least one dichroic dye is provided from 0.01% to 10% by weight, preferably 0.1% to 2% by weight, the at least one blue-violet cut dyes is provided from 0.01% to 10% by weight, preferably 0.05% to 5% by weight and the at least one NIR cut dye is provided from 0.01% to 10% by weight, preferably from 0.05% to 5% by weight.

Without being bound by theory, the blue-violet cut dye and NIR cut dye containing polarized films of the present invention contain a percent transmittance (% T) of the film in the range of 415-455 nm that decreases at least about 10%, including 11%, 12%, 13%, 14%, 15%, 16%, 17%, 18%, 19%, 20%, 21%, 22%, 23%, 24%, 25%, 26%, 27%, 28%, 29%, etc. at any specific wavelength there between including 416 nm, 417 nm, 418 nm, 419 nm, 420 nm, 421 nm, 422 nm, 423 nm, 424 nm, 425 nm, 426 nm, 427 nm, 428 nm, 429 nm, 430 nm, 431 nm, 432 nm, 433 nm, 434 nm, 435 nm, 436 nm, 437 nm, 438 nm, 439 nm, 440 nm, 441 nm, 442 nm, 443 nm, 444 nm, 445 nm, 446 nm, 447 nm, 448 nm, 449 nm, 450 nm, 451 nm, 452 nm, 453 nm, 454 nm compared to a polarized film without a blue-violet cut dye and the percent transmittance (% T) of the film between the range of 780-1400 nm decreases at least about 5%, including 6%, 7%, 8%, 9%, 10% 11%, 12%, 13%, 14%, 15%, 16%, 17%, 18%, 19%, 20%, 21%, 22%, 23%, 24%, 25%, 26%, 27%, 28%, 29%, etc. at any specific wavelength there between including 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1000 nm, 1010 nm, 1020 nm, 1030 nm, 1040 nm, 1050 nm, 1060 nm, 1070 nm, 1080 nm, 1090 nm, 1100 nm, 1110 nm, 1120 nm, 1130 nm, 1140 nm, 1150 nm, 1160 nm, 1170 nm, 1180 nm, 1190 nm, 1200 nm, 1210 nm, 1220 nm, 1230 nm, 1240 nm, 1250 nm, 1260 nm, 1270 nm, 1280 nm, 1290 nm, 1300 nm, 1310 nm, 1320 nm, 1330 nm, 1340 nm, 1350 nm, 1360 nm, 1370 nm, 1380 nm, and 1390 nm compared to a polarized film without a NIR cut dye.

D. Polarized Compositions

In various embodiments, the polarized films of the present invention are included in multilayer products and/or attached to substrates. In one aspect, the polarized film includes at least one outer layer adhering to the polarized film. The outer layer can be composed of polycarbonate (PC), cellulose triacetate (TAC), polyolefinics, polyacrylates, polyesters, polyamides, polysiloxanes, polyimides, polyurethanes, polythiourethanes, polyallylics, polysulfides, polyvinyls, polyarylenes, polyoxides, and polysulfones, or combinations thereof. Any substrate may be used so long as polarized films can be attached thereto or applied thereon. Any of the aforementioned materials can also be included in additional layers, including second, third, fourth, etc., and/or inner and intermediate layers. Any of these layers can include, for example, glass plates of silica glass, hard glass, etc.; quartz plates; plastic plates and sheets (films) of various materials such as ABS resins, acetal resins, (meth)acrylic resins, cellulose acetates, chlorinated polyethers, ethylene-vinyl acetate copolymers, fluororesins, ionomers, methylpenetene polymers, nylons, polyamides, polycarbonates, polyesters [e.g. poly(ethylene terephthalate)s and poly(butylene terephthalate)s], polyimides, polyphenylene oxides, polyphenylene sulfides, poly(allyl sulfone)s, polyarylates, polyethylenes, polypropylenes, polystyrenes, polysulfones, vinyl acetate resins, vinylidene chloride resines, AS resins, vinyl chloride resins, alkyd resins, allyl resins, amino resins, urea resins, melamine resins, epoxy resins, phenolic resins, unsaturated polyester resins, silicone resins, polyurethanes, etc.; and products obtained by coating the surface of the glass plate, the quartz plate, or the plastic plate or sheet (film) with a metal oxide (e.g. silicon oxide, tin oxide, indium oxide, aluminum oxide, titanium oxide, chromium oxide or zinc oxide), silicon nitride, silicon carbide or the like. There can also be used substrates (films) whose surface has been coated with a metal thin film having a high reflectivity. In another aspect, the polarized films are included in ophthalmic lenses with specific electromagnetic radiation filter function containing at least one substrate. Specifically the substrate can be a thermoplastic material including at least one polycarbonate (PC), polyolefinics, (meth)acrylic or thio(meth)acrylic polymers and copolymers, polyesters, polyamides, polysiloxanes, polyimides, polyurethanes, polythiourethanes, polyallylics, polysulfides, polyvinyls, polyarylenes, polyoxides, and polysulfones, and combinations thereof; or a thermoset material containing at least one resin resulting from the polymerization or (co) polymerization of alkylene glycol bis allyl carbonates. The above-exemplified substrates may be either flat or have a curved surface. The polarized films used in ophthalmic lens with specific filter function may also include an outer layer of polar wafer, glue, hard coating layer or a AR coating layer. Without wishing to be bound by theory, light filters that protect the eyes such as blue-violet cut dyes and NIR cut dyes could be added into other layers of the lens besides the PVOH layer, such as the lens substrate, outer layer of polar wafer, glue, hard coating layer, or the AR coating layer.

E. Exemplary Method to Prepare a Polarized Film

A polarized film of the current invention can be prepared by any appropriate method known to those of skill in the art. In particular embodiments, a polarized film of the current invention can be prepared by (a) preparing one or several solutions containing at least one light filter and at least one dichroic dye in water, where the light filter and dichroic dye are in the same solution or in separate solutions, (b) submersing the PVOH film in the solution(s) from step (a) for an amount of time and pulling the film within the solution(s) to remove wrinkles, and (c) stretching the film within the solution(s) to get polarizing function, wherein the at least one dichroic dye or at least one light filter is capable of decreasing the transmission of ultraviolet (UV) light at and below 400 nm, decreasing the transmission of blue-violet light from 415 to 455 nm, or decreasing the transmission of near-infrared (NIR) light from 700 to 1400 nm.

F. Exemplary Method to Prepare a Polarized Lens

A polarized lens of the current invention can be prepared by any appropriate method known to those of skill in the art. In particular embodiments, a polarized lens of the current invention can be prepared by (a) preparing one or several solutions containing at least one light filter and at least one dichroic dye in water, where the light filter and dichroic dye are in the same solution or in separate solutions, (b) submersing the PVOH film in the solution(s) from step (a) for an amount of time and pulling the film within the solution(s) to remove wrinkles, (c) stretching the film within the solution(s) to get polarizing function, wherein the at least one dichroic dye or at least one light filter is capable of decreasing the transmission of ultraviolet (UV) light at and below 400 nm, decreasing the transmission of blue-violet light from 415 to 455 nm, or decreasing the transmission of near-infrared (NIR) light from 700 to 1400 nm, (d) laminating the film from step (c) with polycarbonate (PC) on both sides, (e) thermoforming the laminate into curved wafers, and (f) injection molding polycarbonate (PC) on the concave side.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

PVOH Matrix with High Blue Cut

Raw materials: Water soluble blue cut dye: Basic Yellow 40 from Armor Forensics; Dichroic dyes: Everlight Everdirect Blue, Everlight Everdirect Yellow, Everlight Everdirect Red; PVOH film: DP1700 from Kuraray.

PVOH+blue cut polarized film fabrication: Basic Yellow 40 was mixed with Everlight Everdirect Blue, Everlight Everdirect Yellow, Everlight Everdirect Red in water and a small polar stretching unit was used to get a PVOH film with polarized+blue cut function.

Polarized+blue cut PC lens fabrication: PC/PVOH/PC laminates were made by laminating PC on both sides of the above made PVOH polarized film. Laminates were then thermoformed into wafers, and injection molded with PC on the concave side.

Figure 1:
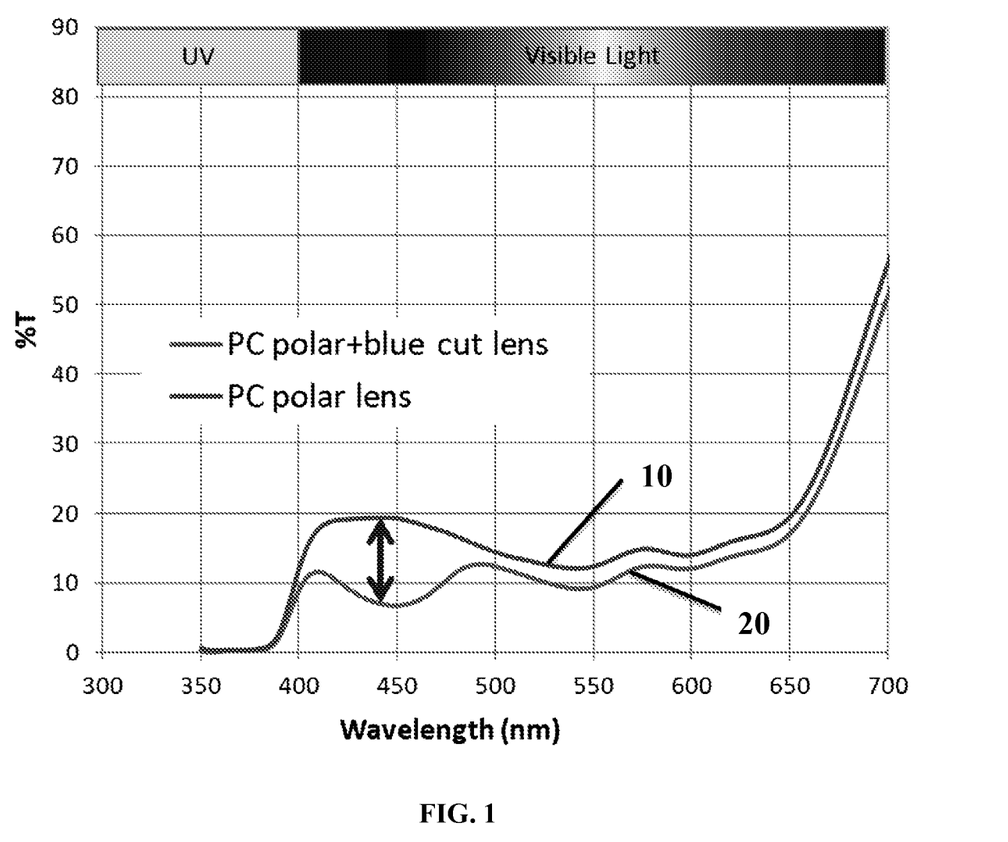
FIG. 1 shows a graphical representation of transmission curves of a polycarbonate polarized lens with and without blue-violet cut dyes.

PVOH polarized lens measurement and comparison to other polarized PC lenses: Transmission curves of PC polarized lenses with and without blue cut dyes are shown in FIG. 1. PC polarized+blue cut lens 20 has higher blue cut then PC polarized lens 10, as indicated by the double ended arrow.

Example 2

PVOH Matrix with Near Infrared Cut

Raw materials: Water soluble NIR cut dye: Epolight 2735; Dichroic dyes: Everlight Everdirect Blue, Everlight Everdirect Yellow, Everlight Everdirect Red; PVOH film: DP1700 from Kuraray.

PVOH polarized+NIR cut film fabrication: NIR dye solution was prepared by dissolving Epolight 2735 and 4'4-thiodiphenyl in water. PVOH clear film was then soaked in the Epolight 2735 solution untill PVOH film gained acceptable NIR cut. The PVOH clear film was then pulled in the Epolight 2735 solution to remove wrinkles and then stretched to get polarized function. It was important to separate the Epolight 2735 tinting step from the dichroic dye tinting step, due to the low tinting capability of Epolight 2735 on PVOH film, compared to dichroic dye.

Figure 2:
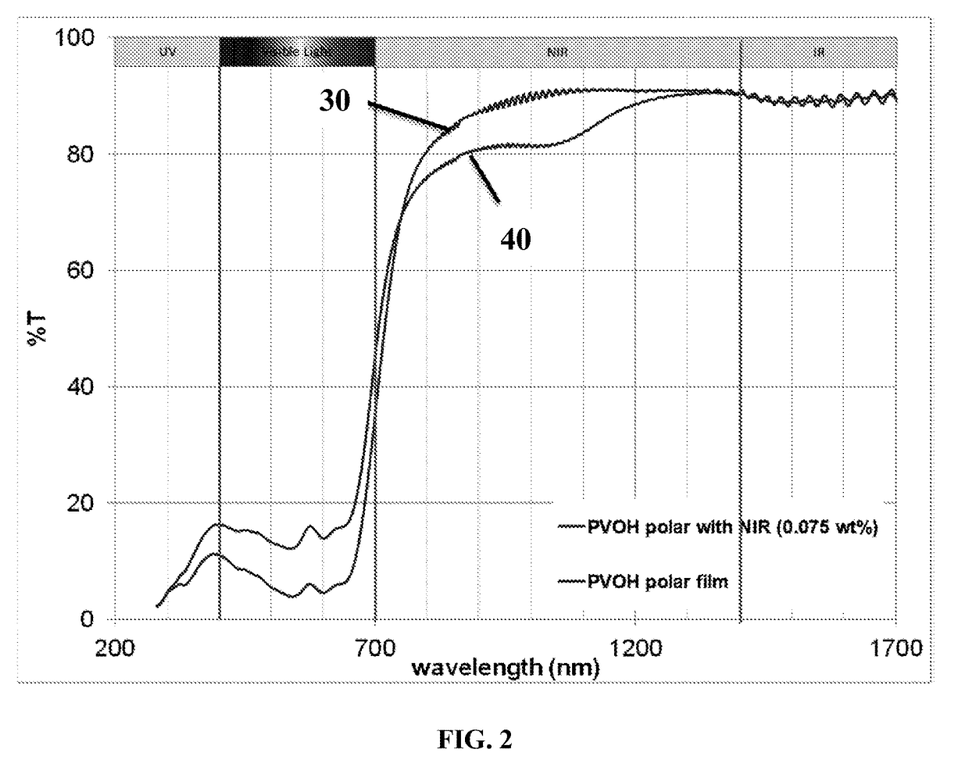
FIG. 2 shows a graphical representation of transmission curves of a polycarbonate polarized lens with and without NIR cut dyes.

PVOH polarized+NIR cut film fabrication: Transmission curves of PC polar lenses with and without infrared cut dyes are shown in FIG. 2. Higher NIR cut was observed on stretched PVOH polarized film with NIR cut dye 40 then without NIR cut dye 30.

The invention claimed is:

1. A polarized film comprising at least one dichroic dye capable of providing polarized function, and at least one light filter capable of decreasing light transmission at specific ranges of wavelengths to provide a dedicated light filtering function, wherein the at least one dichroic dye or at least one light filter is capable of decreasing the percent transmittance (% T) of the film in the NIR range of 700-1400 nm at least about 5% compared to a polarized film without said dichroic dye or light filter.

2. The polarized film according to claim 1, wherein the polarized film further comprises polyvinyl alcohol (PVOH).

3. The polarized film of claim 2, wherein the PVOH has a degree of polymerization that is equal to or greater than 1500.

4. A method to prepare the polarized film of claim 2, the method comprising:
   (a) preparing one or several solutions containing at least one light filter and at least one dichroic dye in water, where the light filter and dichroic dye are in the same solution or in separate solutions;
   (b) submersing the PVOH film in the solution(s) from step (a) for an amount of time and pulling the film within the solution(s) to remove wrinkles; and
   (c) stretching the film within the solution(s) to get polarizing function.

5. A method to prepare a polarized lens comprising the method of claim 4, the method further comprising:
   (d) laminating the film from step (c) with polycarbonate (PC) on both sides;
   (e) thermoforming the laminate into curved wafers; and
   (f) injection molding polycarbonate (PC) on the concave side.

6. The method of claim 4, wherein the at least one dichroic dye or at least one light filter is capable of decreasing the transmission of ultraviolet (UV) light at and below 400 nm.

7. The method of claim 4, wherein the at least one dichroic dye or at least one light filter is capable of decreasing the transmission of blue-violet light from 415 to 455 nm.

8. The polarized film according to claim 1, wherein the at least one dichroic dye is iodine.

9. The polarized film according to claim 1, wherein the at least one dichroic dye or at least one light filter is capable of decreasing the transmission of ultraviolet (UV) light at and below 400 nm.

10. The polarized film according to claim 1, wherein the at least one dichroic dye or at least one light filter is capable of decreasing the transmission of blue-violet light from 415 to 455 nm.

11. The polarized film of claim 1, wherein the at least one light filter comprises water soluble cut dyes or absorbers of UV, blue-violet, IR, or combinations thereof.

12. The polarized film of claim 11, wherein the blue-violet cut dye or absorber is coumarin, porphyrin, perylene, melanin, acriflavine, proflavine, chlorophyll, *Lucifer* yellow, auramine, or derivative thereof and/or the IR cut dye or absorber is amminium salt, cyanines, metal dithiolenes, phtalocyanines, anthraquinone, tetraaryldiamines, or derivative thereof.

13. A multilayer polarized laminate comprising the polarized film of claim 1, wherein the polarized film further comprises at least one outer layer adhering to the polarized film, wherein the outer layer is composed of polycarbonate (PC), cellulose triacetate (TAC), polyolefinics, polyacrylates, polyesters, polyamides, polysiloxanes, polyimides, polyurethanes, polythiourethanes, polyallylics, polysulfides, polyvinyls, polyarylenes, polyoxides, and polysulfones, or combinations thereof.

14. A polarized ophthalmic lens with specific filter function comprising the multilayer polarized laminate of claim 13 and at least one substrate, wherein the substrate is:
- a thermoplastic material comprising at least one polycarbonate (PC), polyolefinics, (meth)acrylic or thio(meth) acrylic polymers and copolymers, polyesters, polyamides, polysiloxanes, polyimides, polyurethanes, polythiourethanes, polyallylics, polysulfides, polyvinyls, polyarylenes, polyoxides, and polysulfones, and combinations thereof; or
- a thermoset material comprising at least one resin resulting from the polymerization or (co)polymerization of alkylene glycol bis allyl carbonates.

15. The polarized film of claim 1, wherein a percent transmittance (% T) of the film in the range of 415-455 nm decreases at least about 10% compared to a polarized film without a blue-violet light filter.

16. A polarized ophthalmic lens with specific filter function comprising the polarized film of claim 1 and at least one substrate, wherein the substrate is:
- a thermoplastic material comprising at least one polycarbonate (PC), polyolefinics, (meth)acrylic or thio(meth) acrylic polymers and copolymers, polyesters, polyamides, polysiloxanes, polyimides, polyurethanes, polythiourethanes, polyallylics, polysulfides, polyvinyls, polyarylenes, polyoxides, and polysulfones, and combinations thereof; or
- a thermoset material comprising at least one resin resulting from the polymerization or (co)polymerization of alkylene glycol bis allyl carbonates.

\* \* \* \* \*

UNITED STATES PATENT AND TRADEMARK OFFICE
CERTIFICATE OF CORRECTION

| | |
|---|---|
| PATENT NO. | : 11,009,724 B2 |
| APPLICATION NO. | : 16/317762 |
| DATED | : May 18, 2021 |
| INVENTOR(S) | : Haifeng Shan et al. |

It is certified that error appears in the above-identified patent and that said Letters Patent is hereby corrected as shown below:

On the Title Page (87) PCT Pub. Date:
Delete "Jan. 8, 2018", and replace with -- Jan. 18, 2018 --.

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*